United States Patent [19]
Schmidt et al.

[11] Patent Number: 5,591,366
[45] Date of Patent: Jan. 7, 1997

[54] INJECTION MOLDING HEATER INCLUDING CIRCUIT BREAKING MEANS

[75] Inventors: Harald Schmidt, Georgetown; Edward J. Jenko, Bolton, both of Canada

[73] Assignee: Husky Injection Molding Systems Ltd., Canada

[21] Appl. No.: 264,777

[22] Filed: Jun. 23, 1994

[51] Int. Cl.⁶ ...................................... H05B 1/02
[52] U.S. Cl. ........................ 219/494; 219/483; 219/481; 219/517; 219/506; 337/290
[58] Field of Search ........................ 219/483–486, 219/501, 506, 481, 517, 494, 497; 174/DIG. 8; 337/297, 273, 290

[56] References Cited

U.S. PATENT DOCUMENTS

| | | | |
|---|---|---|---|
| 3,881,091 | 4/1975 | Day | 219/489 |
| 4,447,712 | 5/1984 | Covillion | 219/486 |
| 4,459,465 | 7/1984 | Knight | 219/309 |
| 4,940,179 | 7/1990 | Soni | 174/DIG. 8 |
| 5,023,430 | 6/1991 | Brekkestran et al. | 219/486 |
| 5,298,300 | 3/1994 | Hosoi et al. | 428/34.9 |

*Primary Examiner*—Mark H. Paschall
*Attorney, Agent, or Firm*—Bachman & LaPointe, P.C.

[57] ABSTRACT

An injection molding heater system for heating molding resins or plastics includes a plurality of heaters for heating resin wherein each of the heaters is positioned adjacent a nozzle or manifold. The system also includes an electrical circuit which is connected with the heaters and carries electricity from a power source to each of the heaters in order to energize the heaters. A plurality of circuit breaking devices are incorporated in the circuit for discontinuing the flow of electricity through each of the electrical circuits for preventing circuit damage in case of overcurrent, surges or the like. At least one circuit breaker is positioned in each of the electrical circuits between the power source and each of the heaters.

25 Claims, 4 Drawing Sheets

5,591,366

INJECTION MOLDING HEATER INCLUDING CIRCUIT BREAKING MEANS

BACKGROUND OF THE INVENTION

This invention relates to injection molding, and more particularly to an improved electrical heater designed for use with injection molders.

Electrical heaters are well known in the injection molding industry for the purpose of directly or indirectly heating plastic resins to the point of melting. A heater of this type, is shown in U.S. Pat. No. 4,268,240 to Rees et al. This heater exemplifies a typical electrical nozzle heater which has an inside diameter substantially equal to the outside diameter of the nozzle. The heater is adapted to be slipped over the nozzle and then tightened into place using any effective fastening means. If the heater should become defective or if it should short circuit, the task of removing and replacing the heater can be a laborious task because of the associated wiring. If there are many heaters in the system, all having wires extending in the same pathway through an electrical junction box or the like, the task of removing and replacing the wires becomes even more complex.

Another problem relating to the use of heaters in injection molding systems, arises when a single power source is used to power all the heaters. Typically, the single power source will be fused but the fuse will be capable of permitting full power to all of the heaters comprising the system, simultaneously. If one heater should short out, the electrical trip circuit of the power source may not be sufficient to immediately blow the fuse, especially if the other heaters are operating at a low current draw. This can result in overheating of the electrically weakest portion of the electrical circuit. As a result, in some cases, an electrical connection pin may burn up or the wiring itself may melt. Both of these situations may result in damage to other wiring or components of the system, causing increased cost based on component repairs, part replacement and production stoppage.

Other problems exist with using currently available electrical heater systems for injection molders. For example, if incorrect wiring is accidentally installed with the electrical heaters, an excessive supply of power may destroy the heaters before a fault is detected and rectified by a power source having one main fuse. In addition, it may be found that the electrical power circuit is operating in an environment within a mold, that is much higher in temperature than anticipated in the original design of the electrical circuit. Accordingly, such higher temperatures can lead to failure of the circuit and damage thereto. As an added problem, electrical safety hazards can occur.

U.S. Pat. No. 5,030,084 to Gellert et al. addresses wiring assembly problems in injection molders by providing a pre-wired conduit system which eases integration of the heater conduit electrical systems into the hot runner. This approach does permit initial benefits, for example, often cumbersome and complicated wiring can be performed at the manufacturers location by experienced personnel prior to shipment to the customer rather than at the molder's site. However, because of the design, repairing a subsequent electrical problem such as replacing a heater and associated wires may still require significant disassembly of the hot runner system. As a result, labor may be intensified rather than reduced. Also, the system discloses no additional means for protecting against overcurrent damage to the electrical circuits or heaters, should a short or surge be encountered.

There is, therefore, a need in the injection molding art for an electrical heater system having means associated with each heater comprising the system for protecting the heaters against overcurrent damage and which allows easy repair.

SUMMARY OF THE INVENTION

The primary object of this invention is to provide an improved electrical heater system for use with resin flow path components of injection molders.

A further object of this invention is to provide an electrical heater system which individually protects the heaters comprising the heater system from overcurrent damage resulting from electrical surges and short circuits.

Another object of this invention is to provide an electrical heater system having an electrical circuit which is easily placed back on line should a surge, short circuit, or the like occur.

Still another object of this invention is to provide an electrical heater system specifically designed for use with nozzles and manifolds which detects current overloads and discontinues the circuit for protecting heaters and/or other components.

Yet another object of this invention is to provide a circuit breaking system for detecting dangerously high temperatures of heated components of injection molders and for discontinuing the circuit upon detecting such temperatures.

The foregoing objects are attained by the inventive improved injection molding heater system for heating molding resins and for use with injection molding nozzles and manifolds, which includes a plurality of heating means for heating the resin wherein a heating means is positioned adjacent each nozzle or manifold comprising a system. The system also includes an electrical circuit which is connected with the heating means and carries electricity from a power source to each of the heating means in order to energize the heating means. A plurality of circuit breaking means are incorporated for discontinuing the flow of electricity through each of the electrical circuit means for preventing system damage. One circuit breaking means is positioned in each of the electrical circuit means between the power source and each of the heating means.

In one embodiment of the invention, the circuit breaking means may be in the form of a fuse or a circuit breaker. The fuse or circuit breaker is adapted to discontinue the flow of current through the electrical circuit when the current flow exceeds the maximum in which the heating means is designed to withstand. In addition, the fuse may be adapted to discontinue the circuit and flow of current when a component of the injection molding system reaches a temperature which exceeds the maximum temperature the system can withstand without damage.

The details of the present invention are set out in the following description and drawings wherein like reference characters depict like elements.

DETAILED DESCRIPTION OF THE PREFERRED EMBODIMENT

Figure 1:
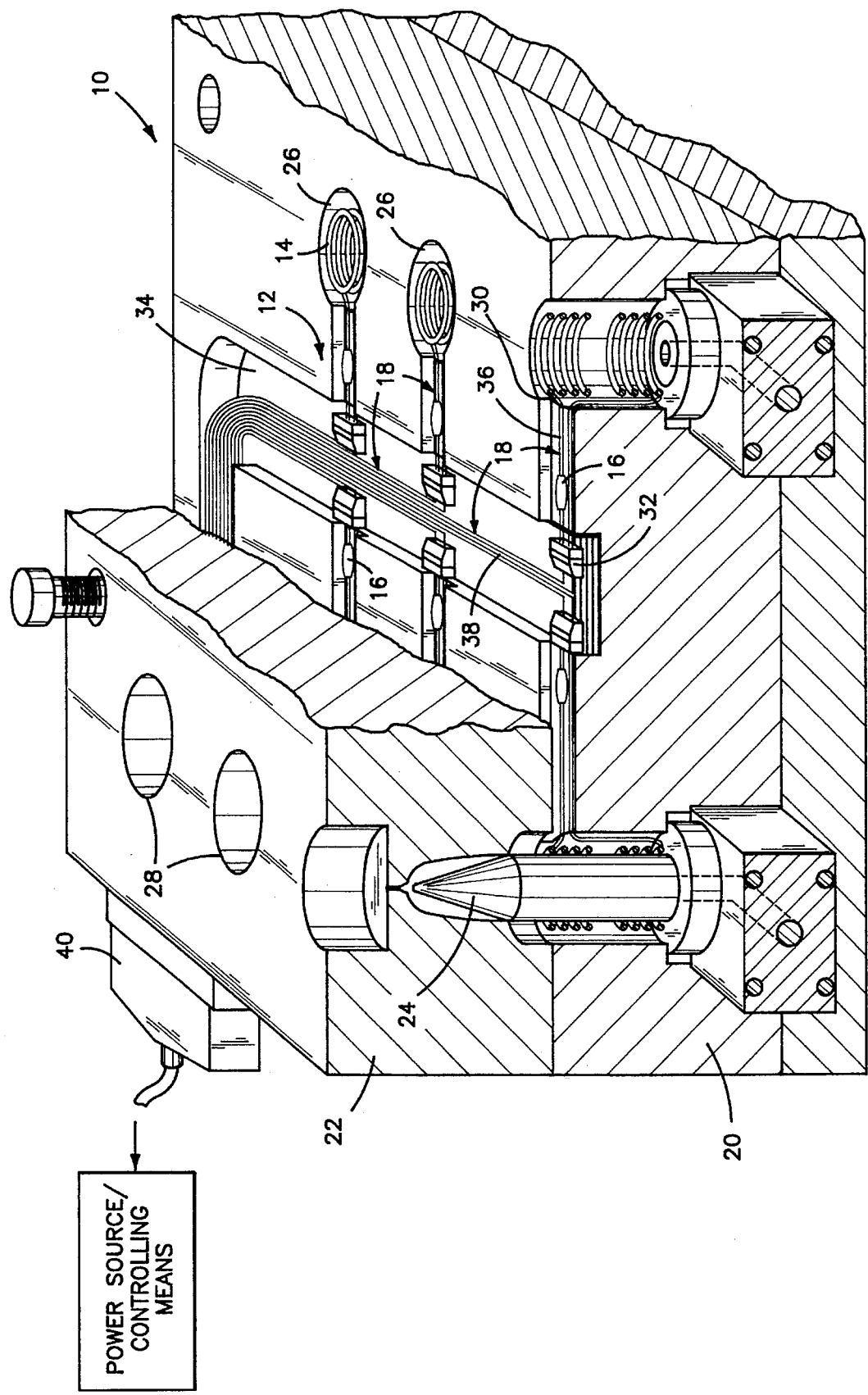
FIG. 1 is a perspective cut-away view of a hot runner of an injection molder, wherein a plurality of heaters are shown, each having independent wiring with a fuse between it and a power source in accordance with the principles of the present invention.

Referring now to the drawings in detail, there is shown in FIG. 1, a perspective view of a hot runner 10 having a plurality of electrical heater systems, designated generally as 12. Each system 12 generally includes a heater 14, a circuit breaking assembly 16, and wiring 18.

FIG. 1 shows an injection molding system having a mold manifold plate 20, a mold cavity plate 22, and a plurality of flow path means or nozzles 24 disposed in wells 26 spaced about mold manifold plate 20. As is well known, melted resin or plastic is injected through nozzles 24 and into cavities 28 of mold cavity plate 22 in order to injection mold the articles being manufactured. Each nozzle 24 is heated by heating means, such as, for example, heaters 14 which are to be disposed in each well 26 adjacent nozzles 24. Any conventional heater may be used, such as, for example, a coil heater as shown schematically in the drawing. The temperature of each nozzle 24 is preferably monitored by a temperature sensing means such as a thermal couple, which may also be mounted in well 26. In this manner, the temperature of each nozzle 24 and, therefore, the temperature of the melted resin supplied through nozzles 24, is individually monitored.

While a plurality of heater systems 12, including a heater 14, a circuit breaking assembly 16, and wiring 18, are shown in FIG. 1, only one system 12 will be described in detail, it being understood that the description applies equally to all heater systems in the hot runner system 10.

Heater 14 is wired such that wiring 18 extends from the heater to a connector 32 positioned in a channel 34. Channel 34 extends substantially the width of manifold plate 20. A first wire portion 36 is electrically connected at one end to heater 14 while the other end extends into connector 32. A second wire portion 38 extends out of connector 32 and into power connector 40 and thence to a power source, shown schematically.

Figure 2:
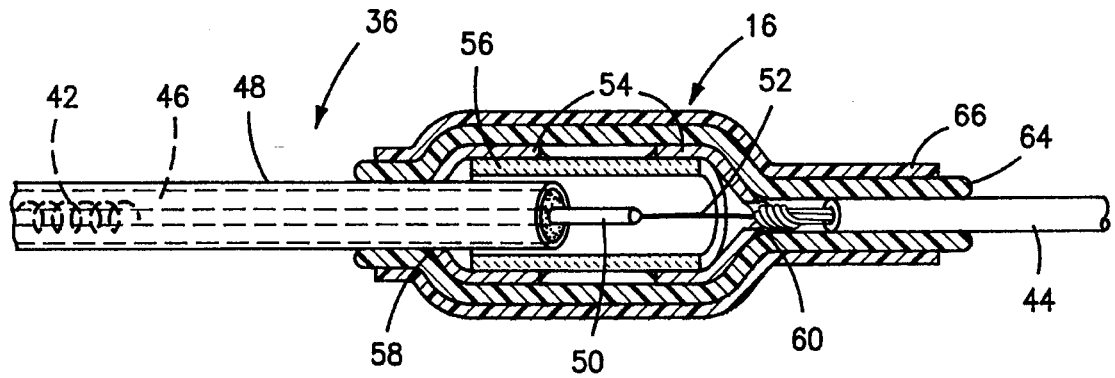
FIG. 2 is a side elevational and cross-sectional view of a heater fuse positioned between a power wire and a heater wire in accordance with the principles of the present invention.

In the main embodiment, first wire portion 36 is comprised of electrically conductive wire and circuit breaking assembly 16. Referring now to FIG. 2, a side elevational view of fuse assembly 16 as a part of first wire portion 36 is shown. Accordingly, first wire portion 36 is divided into three portions, coiled electrical resistance heating wire or element 42, fuse assembly 16 and power wire 44. Electrical resistance heating wire 42 is a coiled wire which is preferably electrically insulated from the environment by an insulation 46 such as magnesium oxide powder. A metal case tubing 48 surrounds and supports heating wire 42 and insulation 46 and acts as a heat transfer medium to the item to be heated. Heating element 42 terminates in contact with an electrical pin 50 wherein pin 50 is joined directly by welding, brazing or other means to a fuse wire 52. Fuse wire 52 may be attached as described above to pin 50 and power wire 44, or it may be attached by any other suitable bonding or mechanical holding means.

Fuse wire 52 is selected to have electrical properties which allow it to conduct a known amount of current into heater 14 (see FIG. 1). This known amount of current is preferably the maximum current in which heater 14 can operate without becoming damaged. Therefore, if an excessive amount of current exceeding the maximum allowed amount for heater 14 is conducted through fuse wire 52, fuse wire 52 will break, thereby discontinuing the circuit.

The junction areas at both ends of fuse wire 52, the areas where fuse wire 52 is connected with pin 50 and power wire 44, are protected from the environment by two opposing metal caps 54 which are bonded on their inner surfaces to a ceramic tube 56, which as a whole forms a hermetically sealed shell surrounding the junctions between fuse wire 52 and pin 50 and between fuse wire 52 and power wire 44. Welding or other sealing means are also used at positions 58 and 60 to complete the seal between the environment and the junctions. In order to further provide protection to the junctions from mechanical abuse and from the exposed section of electrical power wire 44, a heat shrinkable tubing is used wherein the heat shrinkable tubing is constructed of a coaxial polymer material which has an inner portion 64 and an outer portion 66. Inner portion 64 has a relatively lower melting temperature than outer portion 66, such that when the heat shrinkable tubing is heated, inner portion 64 melts while outer portion 66 merely shrinks. This feature creates a conforming seal which grips and holds the entire fuse area including caps 54 and ceramic tube 56, thus encasing and protecting it.

Figure 3:
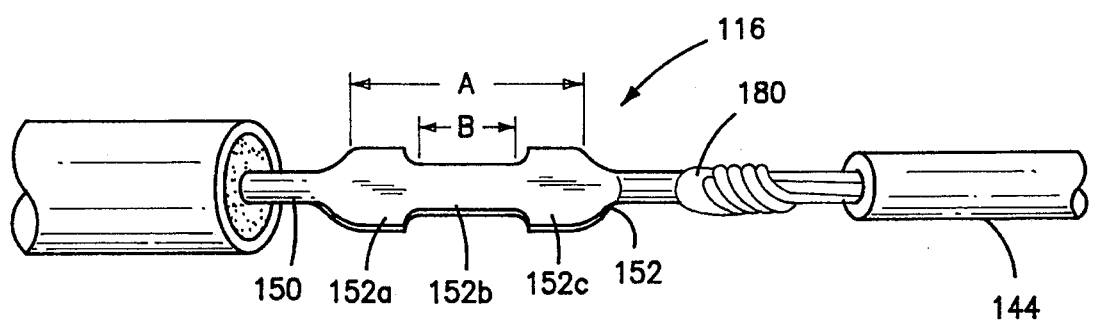
FIG. 3 is a perspective view showing an alternative embodiment of the fuse of FIG. 2, according to the principles of the present invention.

FIG. 3 shows an alternatively designed fuse wire 152 comprising fuse assembly 116 which is adapted to be encased as described above for fuse wire 52. Fuse wire 152, in this embodiment, is an extended flattened portion of pin 150 which has a length A, shown in FIG. 3. Flattened fuse wire 152 has three flattened segments 152a, 152b, 152c, wherein first segment 152a is substantially wider than the rod-shaped body of pin 150, the second segment 152b remains flat, has a length B, and is about half the width of the first segment, and the third segment 152c also remains flat and returns to substantially the original width of the first section having a length substantially equal to segment 152a. After these three segments, pin 150 resumes its rod-shaped form and is connected with power wire 144 at end 180. The narrow segment 152b of fuse wire 152 is designed to have a cross-sectional area which will provide precise fusing at a current exceeding the maximum allowable by the heaters comprising the system. With fuse assembly 116 assembled as shown in FIG. 3, the junctions made are protected and encased in the same manner as described above for fuse assembly 16 of FIG. 2.

Figure 4:
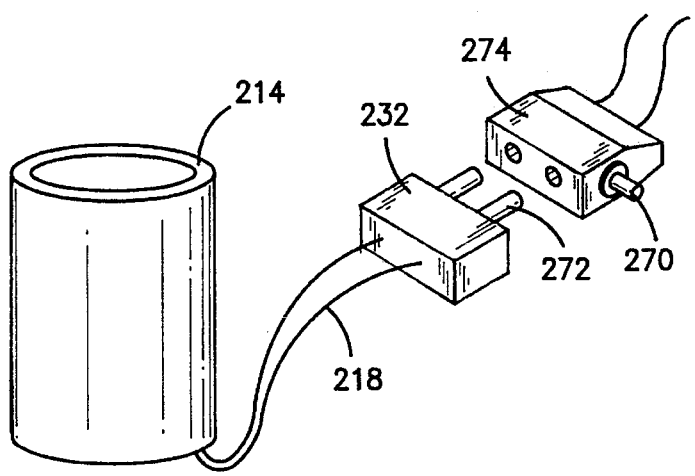
FIG. 4 is a perspective view of an alternative embodiment of this invention wherein a circuit breaker is used between the power source and the heaters.

As an alternative to fuse assemblies 16 and 116, a circuit breaker 270 can be used, as shown in FIG. 4. As described above for wiring 18, wiring 218 extends from heater 214 positioned in a cavity (not shown) and into connector 232. Connector 232 has a plug end 272 which is adapted to be plugged into female receiving end 274 of circuit breaker 270. Accordingly, circuit breaker 270 is integrated into connector 232 so that if the electrical current passing through the connector should surpass the design limit of the circuit breaker, and typically the design limit of heater 214, breaker 270 will disconnect the power transmission between the power source and heater 214. A significant advantage in using this design, is that by using circuit breaker 270, heater 214 may be preserved functionally and electrically in tact, wherein the circuit breaker needs simply to be reset for continuing use of the heater system.

Figure 5:
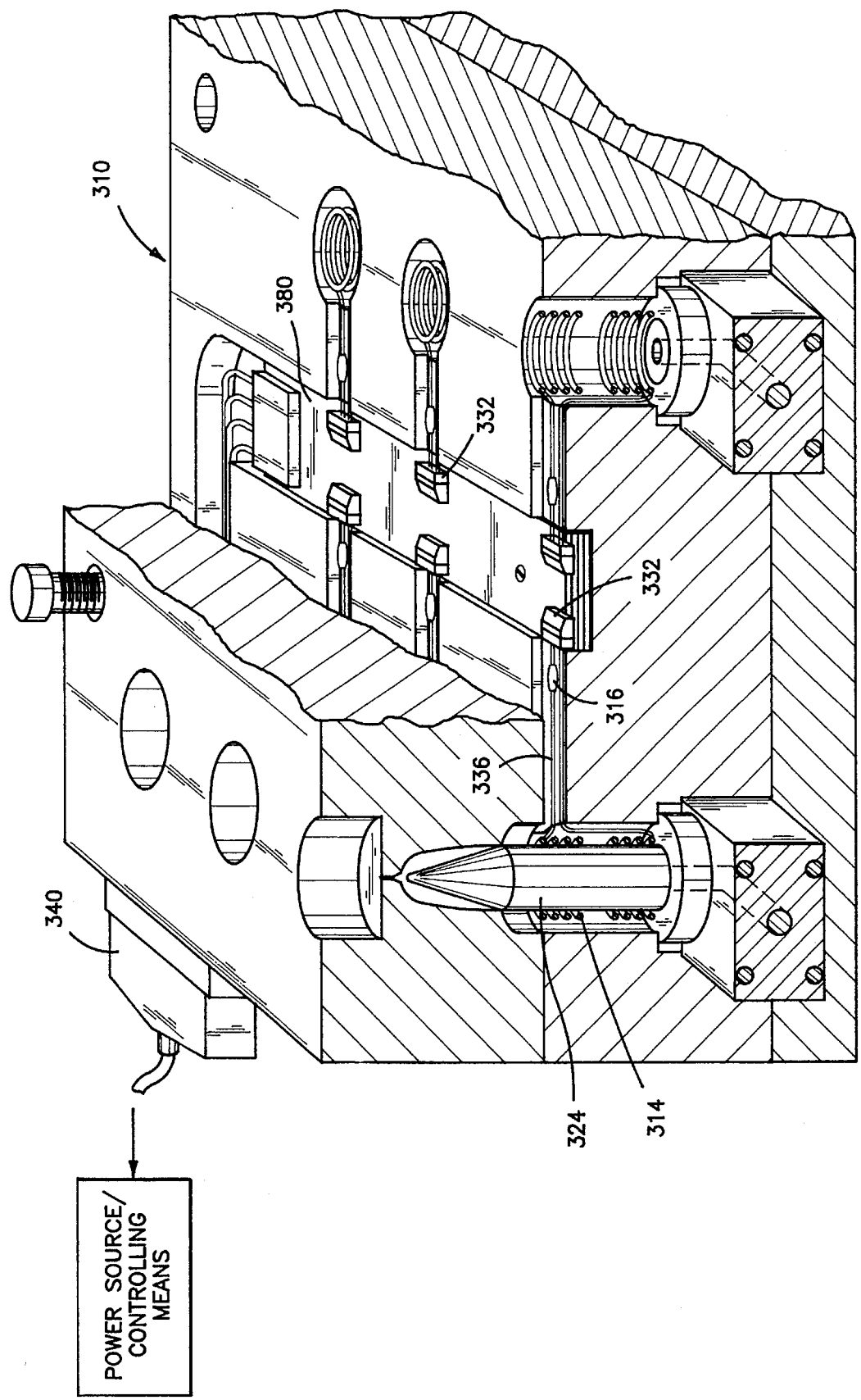
FIG. 5 is a view similar to FIG. 1, of an alternative embodiment, wherein a circuit board is used instead of a wiring harness along with individual fuses for each heater.

FIG. 5 shows a perspective view of another embodiment, wherein with hot runner 310, a circuit board 380 is used in place of the wiring harness shown in FIG. 1. In this embodiment, connectors 332 are electrically connected to circuit board 380. Circuit board 380 is in electrical communication with power connector 340 as in FIG. 1. Similar to the FIG. 1 embodiment, nozzles 324 are surrounded by heaters 314 and heaters 314 are wired via wire portion 336 to connector 332. Also similar to the FIG. 1 embodiment, wire portion 336 includes circuit breaking or fuse assembly 316 similar to those assemblies shown above, 16 or 116, or a circuit breaker (not shown) similar to circuit breaker 270. Circuit board 380 is manufactured to have circuits which are sufficient to transmit power to operate the heaters 314 at full capacity but not substantially more than that. The implementation herein of fuse assemblies 316 or a circuit breaker (not shown), provides protection to the circuit boards should shorts or surges arise in the circuit. Accordingly replacement of an entire circuit board can be avoided wherein maintenance of the circuit would require only the replacement of a heater or the resetting of a circuit breaker, depending on the type of circuit breaking device used.

Figure 6:
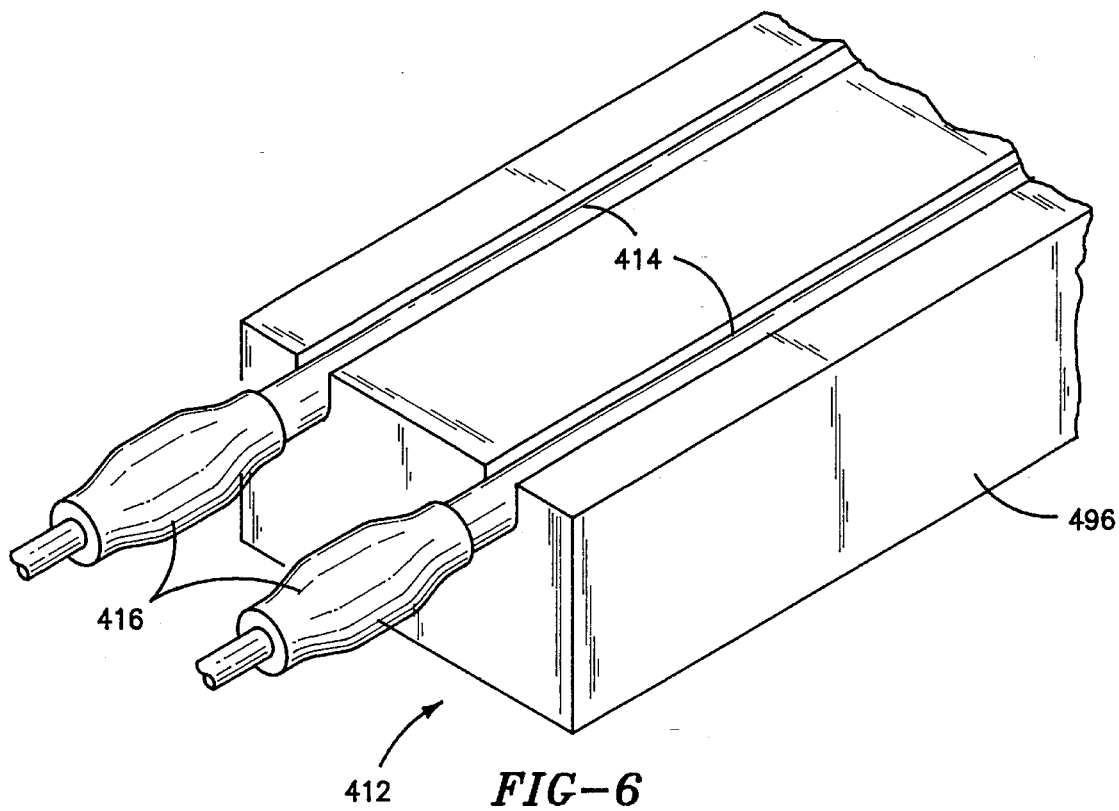
FIG. 6 is a perspective view of an alternative embodiment of the heating system wherein it is used with manifold heaters.

While heater systems, including the heater, wire and circuit breaking assembly, have been discussed to this point with reference to injection nozzles, it is also within the scope of this invention that such a system be used with other flow paths means and hot runner heaters such as with manifolds and manifold heaters as shown in FIG. 6. Also, the system can be applied to heaters required on the machine injection unit.

Another embodiment of this invention is shown in FIG. 6, where a heating system 412 is shown for use with a hot runner manifold 496 and includes manifold heaters 414 and fuse assemblies 416 or circuit breakers (not shown). Fuse assemblies 416 are similar to fuse assemblies 16 and 116 described above. Circuit breaker 270 also described above could be used. The heating system 412 is substantially functionally and structurally the same as described in the above embodiments with the exception of manifold heaters 414 being used instead of nozzle heaters.

Figure 7:
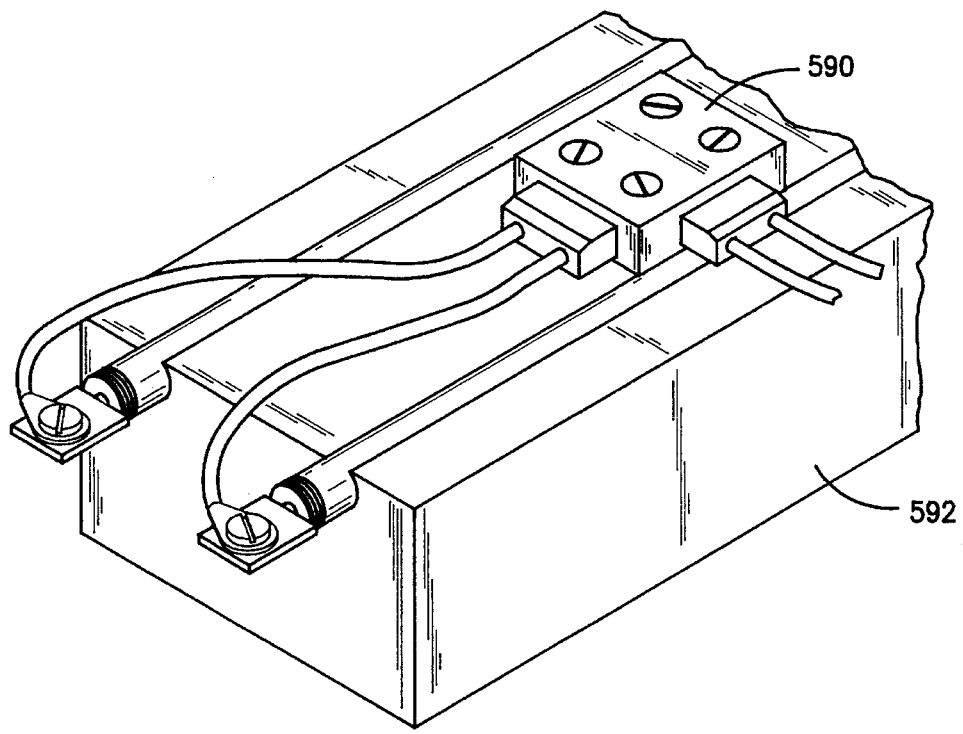
FIG. 7 is a perspective view of another alternative embodiment of this invention showing a hot runner temperature detecting circuit breaking device.

FIG. 7 shows another alternative embodiment of this invention, where instead of measuring current through the heating system circuit as a determinable factor for discontinuing the circuit or at least simultaneous to measuring current, the temperature of components comprising the injection system are measured. Accordingly, when the temperature of the heated component exceeds the design limit of the component, the heating circuit and/or other circuits of the molder are discontinued by a circuit breaker 590 which is positioned between heated component 592 and the power source (not shown) and possibly between additional circuit breaking devices, as described above, for the heaters. This embodiment precludes damage to non-electrical hot runner components due to excessive heating, as a result of incorrect wiring of the system, operator temperature setting error, thermocouple malfunction, etc. Since different temperature design limits naturally exist for different systems or components, a selection of fuses or breakers for different temperature ranges are provided. As an alternative, an adjustable circuit breaker could be used which preferably would be preset with an appropriate temperature limit from the factory.

The primary advantage of this invention is that an improved electrical heater system is provided for use with injection molders. A further advantage of this invention is that an electrical heater system is provided which protects the heaters comprising the systems from overcurrent damage resulting from electrical surges and short circuits. Another advantage is that an electrical heater system is provided having an electrical circuit which is easily placed back on line should a surge, short circuit, or the like occur. Still another advantage of this invention is that an electrical heater system is provided which is specifically designed for use with nozzles and manifolds which detects current overloads and discontinues the circuit for protecting heaters and other components. Yet another advantage of this invention is that a circuit breaking system is provided for detecting dangerously high temperatures of heated components of injection molders and for discontinuing the circuit upon detecting such temperatures.

It is apparent that there has been provided in accordance with this invention an improved injection molding heater which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An electric heater system for heating molding material to maintain the flowability of the material in an injection molding device, comprising:

a flow path means for directing the flow of the material in the injection molding device, wherein said flow path means is a mold manifold;

at least one heating means for heating said material for facilitating flow through said flow path means, said heating means positioned adjacent said flow path means;

an electrical circuit means in said mold manifold connected with said heating means for carrying electric current from a power source to said heating means to energize said heating means; and a circuit breaking means for discontinuing the flow of electricity through said circuit means to prevent damage to the system, wherein said circuit breaking means is positioned in said electrical circuit means in said mold manifold between said source and said heating means, and for each one of said heating means in said circuit there is provided at least one of said circuit breaking means.

2. The system according to claim 1, wherein said flow path means is an injection nozzle.

3. The system according to claim 2, comprising a plurality of said heating means wherein each of said plurality of heating means is electrically connected with one of said circuit breaking means.

4. The system according to claim 2, wherein said circuit breaking means is a fuse assembly.

5. The system according to claim 4, wherein said fuse assembly is comprised of a fuse wire, wherein said fuse wire is joined on one end to a power wire and on the other end to a heating means wire leading to said heating means.

6. The system according to claim 5, wherein said fuse assembly further comprises a protective shell, said protective shell comprised of two caps and a ceramic tube, each of said caps encasing an end of said fuse wire and said ceramic tube extending between and bonded to said caps.

7. The system according to claim 6, wherein said protective shell further comprises a heat shrinkable tubing which encases said ceramic tube and said caps.

8. The system according to claim 7, wherein said tubing is comprised of an inner layer and an outer layer, said inner and outer layers having a melting temperature wherein the melting temperature of said inner layer is lower than the melting temperature of the outer layer, such that with the application of heat to said layers, the inner layer melts and the outer layer shrinks creating a conforming seal around said fuse wire, caps and ceramic tubing.

9. The system according to claim 5, wherein said fuse wire is comprised of a flattened electrically conductive element, said conductive element including a first flattened segment having a first cross sectional area and a second flattened fusing segment having a cross sectional area smaller than said first area, wherein the cross sectional area of said second flattened fusing segment is designed to cause said conductive element to break when the flow of current exceeds the maximum said heating means can withstand without sustaining damage.

10. The system according to claim 4, wherein said fuse assembly is adapted to discontinue said circuit means by breaking when said current exceeds the maximum which said heating means can withstand without sustaining damage.

11. The system according to claim 4, wherein said fuse assembly includes temperature sensing means for measuring the temperature of a heated component of said injection molder, said temperature sensing means adapted to be placed into contact with said heated component and said fuse assembly adapted to discontinue said circuit means by breaking when said component reaches a temperature which exceeds the maximum said component can withstand without sustaining damage.

12. The system according to claim 2, wherein said circuit breaking means is a circuit breaker.

13. The system according to claim 2, wherein said electrical circuit means comprises a circuit board.

14. The system according to claim 1, comprising a plurality of said heating means wherein each of said plurality of heating means is electrically connected with one of said circuit breaking means.

15. The system according to claim 1, wherein said circuit breaking means is a fuse assembly.

16. The system according to claim 15, wherein said fuse assembly is comprised of a fuse wire, wherein said fuse wire is joined on one end to a power wire and on the other end to a heating means wire leading to said heating means.

17. The system according to claim 16, wherein said fuse assembly further comprises a protective shell, said protective shell comprised of two caps and a ceramic tube, each of said caps encasing an end of said fuse wire and said ceramic tube extending between and bonded to said caps.

18. The system according to claim 17, wherein said protective shell further comprises a heat shrinkable tubing which encases said ceramic tube and said caps.

19. The system according to claim 18, wherein said tubing is comprised of an inner layer and an outer layer, said inner and outer layers having a melting temperature wherein the melting temperature of said inner layer is lower than the melting temperature of the outer layer, such that with the application of heat to said layers, the inner layer melts and the outer layer shrinks creating a conforming seal around said fuse wire, caps and ceramic tubing.

20. The system according to claim 16, wherein said fuse wire is comprised of a flattened electrically conductive element, said conductive element including a first flattened segment having a first cross sectional area and a second flattened fusing segment having a cross sectional area smaller than said first area, wherein the cross sectional area of said second flattened fusing segment is designed to cause said conductive element to break when the flow of current exceeds the maximum which said heating means can withstand without sustaining damage.

21. The system according to claim 15, wherein said fuse is adapted to discontinue said circuit means by breaking when said current exceeds the maximum which said heating means can withstand without sustaining damage.

22. The system according to claim 12, wherein said fuse assembly further includes temperature sensing means for measuring the temperature of a heated component of said injection molder, said temperature sensing means adapted to be placed into contact with said heated component and said fuse assembly adapted to discontinue said circuit means by breaking when said component reaches a temperature which exceeds the maximum said component can withstand without sustaining damage.

23. The system according to claim 1, wherein said circuit breaking means is a circuit breaker.

24. The system according to claim 1, wherein said circuit means comprises a circuit board.

25. The system according to claim 1, wherein said mold manifold is a hot runner mold manifold plate and said circuit breaking means is positioned inside said mold manifold plate.

* * * * *